United States Patent
Su et al.

(10) Patent No.: US 7,475,049 B2
(45) Date of Patent: Jan. 6, 2009

(54) HETEROTOPIAS CYBERSPACE MODULE

(75) Inventors: Yea-Huey Su, Taipei (TW); Yu-Cheng Chuang, Taichung (TW); Yu-Yun Cheng, Banciao (TW); Yi-Min Tseng, Taoyuan (TW); Yu-Jhih Huang, Slaying Township, Tainan County (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 11/357,155

(22) Filed: Feb. 21, 2006

(65) Prior Publication Data
US 2006/0277320 A1  Dec. 7, 2006

(30) Foreign Application Priority Data
May 20, 2005  (TW) .............................. 94116420 A

(51) Int. Cl.
*G06N 5/00*  (2006.01)

(52) U.S. Cl. .......................................... 706/45; 706/47
(58) Field of Classification Search .................. 706/45;
709/229; 717/174; 707/10; 434/236
See application file for complete search history.

(56) References Cited

U.S. PATENT DOCUMENTS

| | | | |
|---|---|---|---|
| 6,283,761 B1 * | 9/2001 | Joao ............................ 434/236 |
| 6,356,905 B1 * | 3/2002 | Gershman et al. ............. 707/10 |
| 6,606,744 B1 * | 8/2003 | Mikurak ...................... 717/174 |
| 6,697,824 B1 * | 2/2004 | Bowman-Amuah ......... 709/229 |

OTHER PUBLICATIONS

Nelson, Context-Aware and Location Systems, Thesis, Clare College, 1998, pp. 1-158.*

* cited by examiner

*Primary Examiner*—Wilbert L Starks, Jr.
(74) *Attorney, Agent, or Firm*—Troxell Law Office, PLLC

(57) ABSTRACT

In the present invention, users on the Internet can share and accumulate experiences by referencing to different uses' experience data.

8 Claims, 3 Drawing Sheets

HETEROTOPIAS CYBERSPACE MODULE

FIELD OF THE INVENTION

The present invention relates to a cyberspace module; more particularly, relates to sharing and accumulating experiences by and for more than one independent objects in a cyberspace.

DESCRIPTION OF THE RELATED ART

A prior art, titled "Computing system for AI (artificial intelligence) process", in Taiwan is proclaimed comprising an AI engine to obtain analysis parameters by a cross-comparison analysis to a front-end code and a back-end code; a user interface for a user to input specific data for outputting a comparison result; a static analysis module to run a static analysis to the comparison result and to modify the parameters of the analysis according to the comparison result; and an experience parameter modification module to modify the front-end code and the back-end code according to the result of the static analysis done by the static analysis module.

Nevertheless, the prior art runs a cross-comparison analysis only to the front-end code and the back-end code. Therefore, although the above prior art can modify the front-end code and the back-end code by the experience parameter modification module, the modification would always be the same whenever the user enters the same front-end code and the back-end code. As a result, the prior art can not obtain related affairs nor accumulate experiences. Hence, the prior art does not fulfill users' requests on actual use.

SUMMARY OF THE INVENTION

The main purpose of the present invention is for more than one independent object to enter an integrating component to share and accumulate experiences in a cyberspace by utilizing a circumstance component of each in dependent object.

To achieve the above purpose, the present invention is an heterotopias cyberspace module, where the heterotopias cyberspace module comprises an operational platform; the operational platform comprises an integrating component and more than one independent object to influence other independent object and share information; each independent object respectively comprises a circumstance component; the independent object enters the integrating component to share information within the circumstance component; information within the circumstance components from the independent objects are integrated; and a feedback of the integrated information is returned to each independent object to update the information within the circumstance component. Accordingly, a novel heterotopias cyberspace module is obtained

BRIEF DESCRIPTIONS OF THE DRAWINGS

Figure 1:
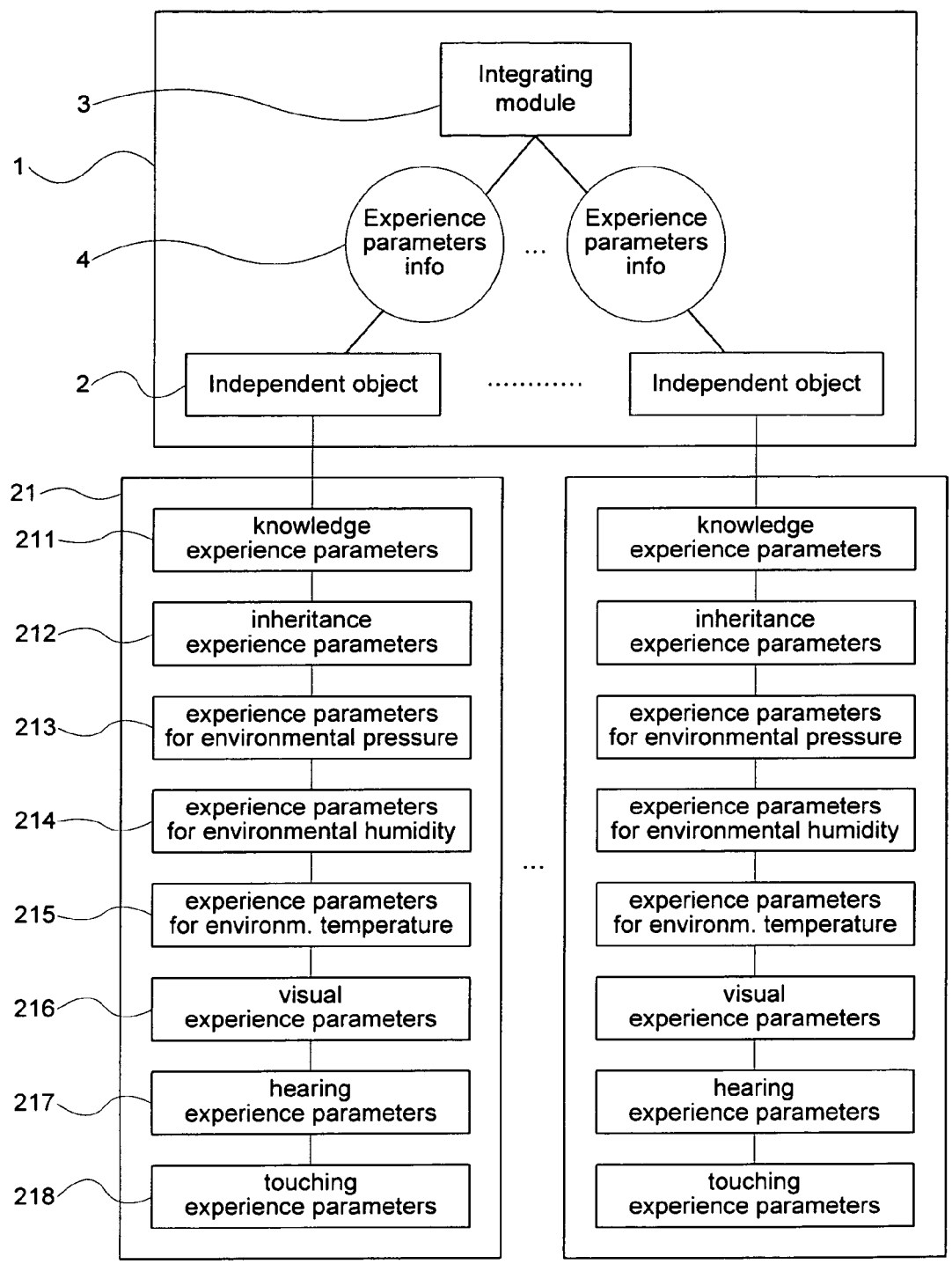
Figure 2:
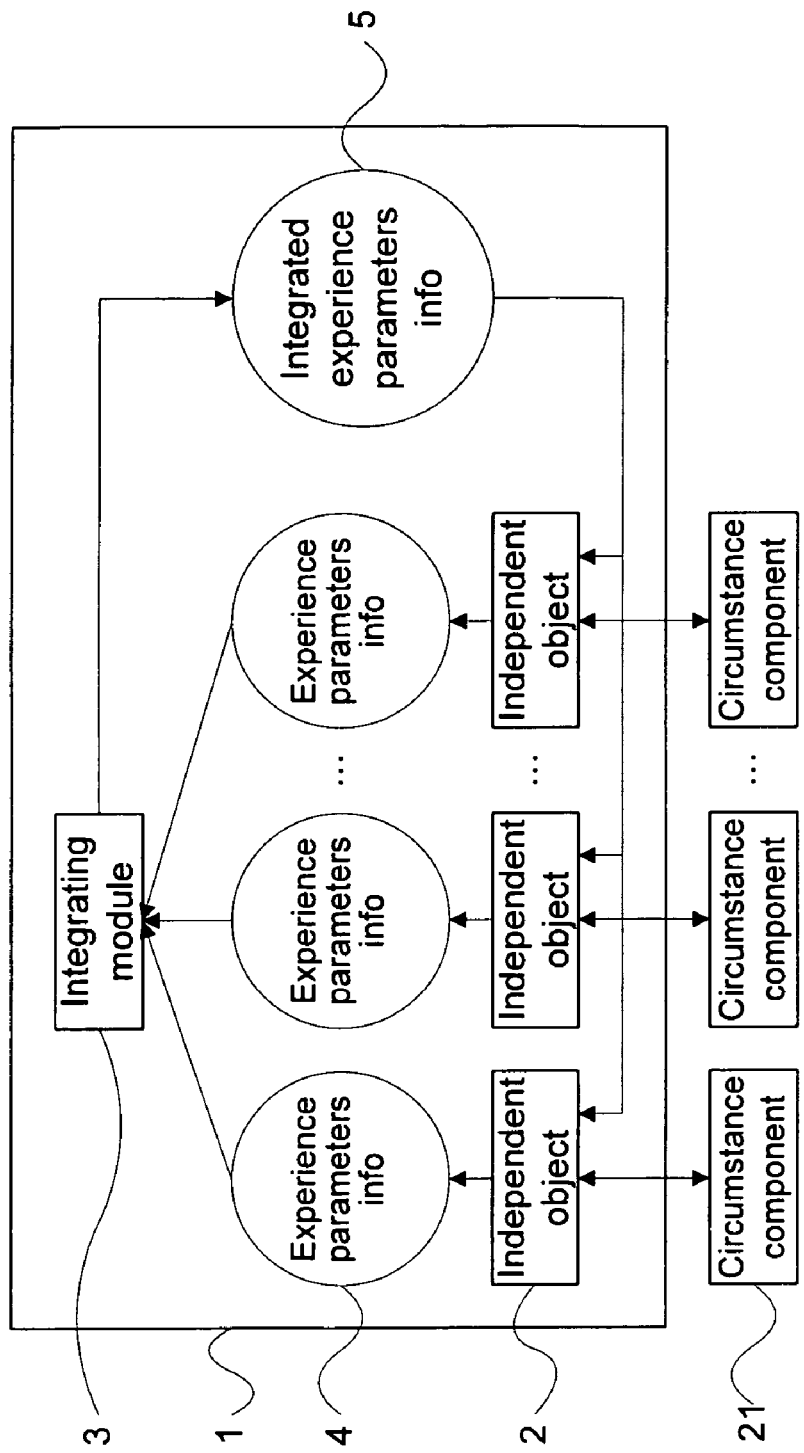
Figure 3:
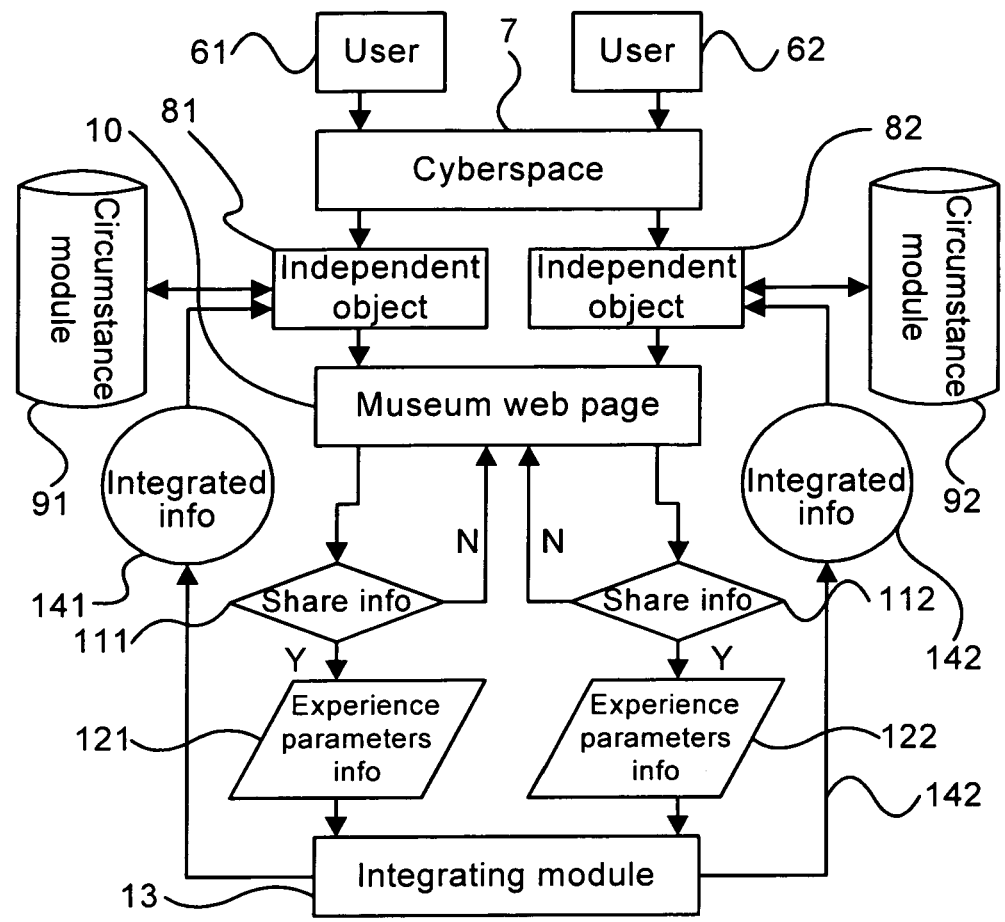

The present invention will be better understood from the following detailed description of the preferred embodiment according to the present invention, taken in conjunction with the accompanying drawings, in which FIG. 1 is a block view according to a first preferred embodiment of the present invention;

FIG. 2 is a flow view showing a state of use according to the first preferred embodiment of the present invention; and FIG. 3 is a view showing a flow chart according to a second preferred embodiment of the present invention.

DESCRIPTION OF THE PREFERRED EMBODIMENT

The following description of the preferred embodiment is provided to understand the features and the structures of the present invention.

Please refer to FIG. 1, which is a block view according to a preferred embodiment of the present invention. As shown in the figure, the present invention is an heterotopias cyberspace module, where more than one independent object shares and accumulates experiences in a cyberspace.

A cyberspace module according to the present invention provides an operational platform 1, where the operational platform 1 can be a main frame computer; or a cyberspace comprising a server and more than one PC (personal computer). The operational platform 1 comprises an integrating component 3 and more then one independent object 2. If the operational platform 1 is a main frame computer, the integrating component 3 and the independent objects are located in the main frame computer. If the operational platform 1 is a cyberspace, the integrating component 3 is located on the server and the independent objects are located on the PCs. Each independent object 2 respectively comprises a circumstance component 21 where the circumstance component 21 comprises sets of information, or sets of experience parameters in another word; and the sets of experience parameters, comprising a set of knowledge experience parameters 211, a set of inheritance experience parameters 212, a set of experience parameters for environmental pressure 213, a set of experience parameters for environmental humidity 214, a set of experience parameters for environmental temperature 215, a set of visual experience parameters 216, a set of hearing experience parameters 217 and a set of touching experience parameters 218. Each in dependent object 2 enters into the integrating component 3 to share the information within the circumstance component 21 by producing information of experience parameters 4. Then the information of experience parameters 4 are integrated by the integrating component 3 to return a feed back to each in de pen dent object 2 for updating its own information in the circumstance components 21. Thus, by the above structure, a novel heterotopias cyberspace module is obtained.

Please refer to FIG. 2, which is a flow view showing a state of use according to the preferred embodiment of the present invention. As shown in the figure, when using the present invention, independent objects 2 dialect and communicate in an operational platform 2, where each independent object 2 has sets of basic parameters for a plurality of affairs. When a question concerning one of the affairs is raised by an independent object 2, every independent object 2 produces information of experience parameters 4 from its own experience parameters in the circumstance component 21 which are related to the question. Then the information of experience parameters 4 from all independent objects 2 are integrated by the integrating component 3 to obtain an integrated information of experience parameters 5. And, then, the integrated information of experience parameters 5 are returned back to each independent object 2. At this moment, the independent object 2 assimilates the integrated information of experience parameters 5 respectively so that the original information of experience parameters 4 are changed at each occurrence of recursively obtained integrated information of experience parameters 5. During the changes of the information of experience parameters 4, the set of basic parameters for the affair of the question raised is unchangeable. Yet, during receiving different integrated information of experience parameters 5, the circumstance component 21 of the independent object 2 are changed and the experience parameters in the circumstance component 21 are accumulated. In the other hand, the independent object 2 can decide to share the experience parameters in the circumstance component 21; or decide not to share.

Please refer to FIG. 3, which is a view showing a flow chart according to a second preferred embodiment of the present invention. As shown in the figure when two users 61, 62 logon to a cyberspace platform 7, an independent object 81, 82 having a circumstance module 91, 92 is formed for each user respectively. When the users 61,62 enter into a museum web page 10, information within the circumstance modules 91, 92 can be shared and each user 61, 62 can decide whether to share 111, 112 information (experience parameters) within the circumstance module 91, 92. If a user 61, 62 agrees to share information, the user 61, 62 produces a set of related experience parameters 121, 122 from the circumstance module 91, 92 by the independent object 81, 82; then sets of related experience parameters 121,122, i.e. heterotopias cyberspace data, from the agreed users 61, 62 are integrated; in the end, the integrated heterotopias cyberspace data 141, 142 are returned back to the independent object 81, 82 of the agreed users 61, 62 for updating the information within the circumstance module 91, 92. If a user 61, 62 does not agree to share information, the user 61, 62 is returned back to the museum web page 10.

To sum up, the present invention is an heterotopias cyberspace module, where more than one independent object enters into an integrating component to share and accumulate experiences in a cyberspace by using more than one circumstance component.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An heterotopias cyberspace module, comprising an operational platform,
    said operational platform comprising an integrating component and more than one independent object,
    said independent object comprising a circumstance component,
    said circumstance component comprising sets of information,
    wherein said more than one independent object enters said integrating component to share said sets of information in said circumstance component;
    wherein said shared sets of information from said more than one independent object are integrated by said integrating component; and
    wherein a feedback of said integrated shared information is returned to each independent object,
    wherein said sets of information comprises a set of experience parameters for environmental pressure.

2. The module according to claim 1, wherein said operational platform is a main frame computer.

3. The module according to claim 1, wherein said operational platform is a cyberspace
    wherein said cyberspace comprises a server and more than one PC (personal computer); and
    wherein said integrating component is located on said server and said more than one independent object is located on said PC.

4. The module according to claim 1, wherein said independent object shares said sets of information of said circumstance component.

5. The module according to claim 1, wherein said independent object does not share said sets of information of said circumstance component.

6. An heterotopias cyberspace module, comprising an operational platform,
    said operational platform comprising an integrating component and more than one independent object,
    said independent object comprising a circumstance component,
    said circumstance component comprising sets of information,
    wherein said more than one independent object enters said integrating component to share said sets of information in said circumstance component;
    wherein said shared sets of information from said more than one independent object are integrated by said integrating component; and
    wherein a feedback of said integrated shared information is returned to each independent object,
    wherein said sets of information comprises a set of experience parameters for environmental humidity.

7. An heterotopias cyberspace module, comprising an operational platform,
    said operational platform comprising an integrating component and more than one independent object,
    said independent object comprising a circumstance component,
    said circumstance component comprising sets of information,
    wherein said more than one independent object enters said integrating component to share said sets of information in said circumstance component;
    wherein said shared sets of information from said more than one independent object are integrated by said integrating component; and
    wherein a feedback of said integrated shared information is returned to each independent object,
    wherein said sets of information comprises a set of experience parameters for environmental temperature.

8. An heterotopias cyberspace module, comprising an operational platform,
    said operational platform comprising an integrating component and more than one independent object,
    said independent object comprising a circumstance component,
    said circumstance component comprising sets of information,
    wherein said more than one independent object enters said integrating component to share said sets of information in said circumstance component;
    wherein said shared sets of information from said more than one independent object are integrated by said integrating component; and
    wherein a feedback of said integrated shared information is returned to each independent object,
    wherein said sets of information comprises a set of hearing experience parameters.

* * * * *